(12) United States Patent
Offenbacher et al.

(10) Patent No.: US 10,000,984 B2
(45) Date of Patent: Jun. 19, 2018

(54) WELLBORE FLUID USED WITH OIL-SWELLABLE ELEMENTS

(71) Applicant: M-I, L.L.C., Houston, TX (US)

(72) Inventors: Matthew Offenbacher, Houston, TX (US); Balkrishna Gadiyar, Katy, TX (US)

(73) Assignee: M-I L.L.C., Houston, TX (US)

( * ) Notice: Subject to any disclaimer, the term of this patent is extended or adjusted under 35 U.S.C. 154(b) by 123 days.

(21) Appl. No.: 14/414,075

(22) PCT Filed: Jul. 8, 2013

(86) PCT No.: PCT/US2013/049572
§ 371 (c)(1),
(2) Date: Jan. 9, 2015

(87) PCT Pub. No.: WO2014/011546
PCT Pub. Date: Jan. 16, 2014

(65) Prior Publication Data
US 2015/0191983 A1    Jul. 9, 2015

Related U.S. Application Data

(60) Provisional application No. 61/669,379, filed on Jul. 9, 2012.

(51) Int. Cl.
*E21B 23/06* (2006.01)
*C09K 8/40* (2006.01)
(Continued)

(52) U.S. Cl.
CPC ............. *E21B 23/06* (2013.01); *C09K 8/40* (2013.01); *C09K 8/502* (2013.01); *E21B 7/00* (2013.01); *E21B 33/12* (2013.01); *E21B 33/1208* (2013.01)

(58) Field of Classification Search
CPC . E21B 23/06; E21B 7/00; E21B 33/12; E21B 33/1208; C09K 8/40; C09K 8/502
See application file for complete search history.

(56) References Cited

U.S. PATENT DOCUMENTS 4,528,104 A     7/1985  House et al.
5,888,944 A *   3/1999  Patel ................... C09K 8/32
                                                   166/300

(Continued)

FOREIGN PATENT DOCUMENTS

WO     2003/042324 A1    5/2003

OTHER PUBLICATIONS

International Search Report and Written Opinion for corresponding PCT Application No. PCT/US2013/049572 dated Oct. 7, 2013, 13 pages.

(Continued)

*Primary Examiner* — Zakiya W Bates
*Assistant Examiner* — Crystal J Miller
(74) *Attorney, Agent, or Firm* — Sara K. M. Hinkley; David J. Smith

(57) ABSTRACT

A method for completing a wellbore may include introducing an oil-containing wellbore fluid into a wellbore having water-based filtercake on walls thereof, contacting the oil-containing wellbore fluid with an oil-swellable element in the wellbore; and allowing swelling of the oil-swellable element, where the oil-containing wellbore fluid is substantially free of unassociated surfactants, emulsifiers, or dispersants and may include an oleaginous fluid and a weighting agent.

25 Claims, 2 Drawing Sheets

(51) Int. Cl.
*E21B 33/12* (2006.01)
*C09K 8/502* (2006.01)
*E21B 7/00* (2006.01)

(56) References Cited

U.S. PATENT DOCUMENTS

| | | | |
|---|---|---|---|
| 5,909,774 A * | 6/1999 | Griffith | C09K 8/32 166/291 |
| 6,586,372 B1 | 7/2003 | Bradbury et al. | |
| 6,631,764 B2 * | 10/2003 | Parlar | C09K 8/52 166/278 |
| 7,143,832 B2 | 12/2006 | Freyer | |
| 7,176,165 B2 | 2/2007 | Massam et al. | |
| 7,392,845 B2 * | 7/2008 | Berry | C09K 8/524 166/300 |
| 7,481,273 B2 * | 1/2009 | Javora | C09K 8/52 166/300 |
| 7,849,930 B2 | 12/2010 | Chalker et al. | |
| 7,855,168 B2 * | 12/2010 | Fuller | C09K 8/508 166/276 |
| 7,906,464 B2 * | 3/2011 | Davidson | C09K 8/52 507/235 |
| 7,939,474 B2 * | 5/2011 | Blauch | C09K 8/035 507/220 |
| 8,091,645 B2 * | 1/2012 | Quintero | C09K 8/32 166/278 |
| 8,100,190 B2 * | 1/2012 | Weaver | C09K 8/36 166/179 |
| 8,105,989 B2 * | 1/2012 | Svoboda | C09K 8/32 166/311 |
| 8,168,569 B2 * | 5/2012 | Ballard | C09K 8/03 166/305.1 |
| 8,598,096 B2 * | 12/2013 | Ballard | C09K 8/03 166/305.1 |
| 9,328,280 B2 * | 5/2016 | Bishop | C09K 8/035 |
| 2001/0036905 A1 * | 11/2001 | Parlar | C09K 8/52 507/200 |
| 2004/0127366 A1 | 7/2004 | Bradbury et al. | |
| 2005/0101493 A1 | 5/2005 | Bradbury et al. | |
| 2005/0176852 A1 | 8/2005 | Okel et al. | |
| 2005/0277553 A1 | 12/2005 | Massam et al. | |
| 2006/0073986 A1 * | 4/2006 | Jones | C09K 8/36 507/129 |
| 2006/0188651 A1 | 8/2006 | Bradbury et al. | |
| 2006/0225615 A1 | 10/2006 | Raman et al. | |
| 2006/0228632 A1 | 10/2006 | Boyer et al. | |
| 2006/0281009 A1 | 12/2006 | Boyer et al. | |
| 2007/0074869 A1 * | 4/2007 | Svoboda | C04B 28/02 166/294 |
| 2007/0151724 A1 | 7/2007 | Ohmer et al. | |
| 2007/0205002 A1 | 9/2007 | Baaijens et al. | |
| 2008/0017376 A1 | 1/2008 | Badalamenti et al. | |
| 2008/0041589 A1 * | 2/2008 | Oakley | C09K 8/03 166/278 |
| 2008/0064613 A1 * | 3/2008 | Massam | C09K 8/03 507/137 |
| 2008/0067468 A1 | 3/2008 | Pickens et al. | |
| 2008/0169130 A1 * | 7/2008 | Norman | C09K 8/05 175/65 |
| 2008/0200354 A1 * | 8/2008 | Jones | C09K 8/524 507/244 |
| 2008/0308283 A1 | 12/2008 | Freyer | |
| 2009/0114394 A1 * | 5/2009 | Javora | C09K 8/524 166/312 |
| 2009/0192052 A1 * | 7/2009 | Zhang | C09K 8/032 507/140 |
| 2009/0218107 A1 | 9/2009 | Chauffe | |
| 2010/0009874 A1 * | 1/2010 | Ballard | C09K 8/03 507/118 |
| 2010/0190664 A1 * | 7/2010 | Svoboda | C09K 8/32 507/136 |
| 2010/0252259 A1 * | 10/2010 | Horton | C09K 8/64 166/271 |
| 2010/0292386 A1 | 11/2010 | Okel | |
| 2010/0300967 A1 * | 12/2010 | Dakin | C09K 8/52 210/634 |
| 2010/0323933 A1 | 12/2010 | Fuller et al. | |
| 2011/0036572 A1 * | 2/2011 | Weaver | C09K 8/28 166/292 |
| 2011/0036573 A1 * | 2/2011 | Weaver | C09K 8/36 166/295 |
| 2012/0061083 A1 | 3/2012 | Ballard | |
| 2012/0175134 A1 * | 7/2012 | Robisson | E21B 33/1208 166/387 |
| 2012/0202718 A1 * | 8/2012 | Ballard | C09K 8/03 507/121 |
| 2013/0220608 A1 * | 8/2013 | Rincon-Torres | C09K 8/70 166/285 |
| 2014/0110119 A1 * | 4/2014 | Luyster | C09K 8/502 166/305.1 |
| 2014/0162909 A1 * | 6/2014 | Ballard | C09K 8/03 507/116 |
| 2014/0336085 A1 * | 11/2014 | Bishop | C09K 8/035 507/126 |
| 2015/0159074 A1 * | 6/2015 | Luyster | C09K 8/03 166/305.1 |
| 2015/0175871 A1 * | 6/2015 | Mettath | C09K 8/03 166/312 |
| 2015/0197998 A1 * | 7/2015 | Kapila | C09K 8/34 166/244.1 |

OTHER PUBLICATIONS

Office Action for the equivalent Columbian application No. 15-25.869 dated Apr. 15, 2015.

Office Action for the correspondent Columbian application No. 14-184.001 dated May 27, 2016.

Office Action for the equivalent Columbian application No. 15-25.869 dated Oct. 6, 2016.

Office Action for the correspondent Columbian application No. 14-184.001 dated Dec. 20, 2016.

* cited by examiner

WELLBORE FLUID USED WITH OIL-SWELLABLE ELEMENTS

BACKGROUND

When completing wells in earth formations, various fluids generally are used in the well for a variety of reasons. Common uses for wellbore fluids include: lubrication and cooling of drill bit cutting surfaces during general drilling operations or drilling in a targeted petroliferous formation, suspending dislodged formation pieces and transporting them to the surface, controlling formation fluid pressure to prevent blowouts, maintaining well stability and minimizing fluid loss into the formation through which the well is being drilled, fracturing the formation in the vicinity of the well, displacing the fluid within the well with another fluid, cleaning the well, testing the well, transmitting hydraulic horsepower to the drill bit, emplacing a packer, abandoning the well or preparing the well for abandonment, and otherwise treating the well or the formation.

Wellbore fluids or muds may include a base fluid, which is commonly water, diesel or mineral oil, or a synthetic compound. Weighting agents (most frequently barium sulfate or barite is used) may be added to increase density, and clays such as bentonite may be added to help remove cuttings from the well and to form a filtercake on the walls of the hole.

Wellbore fluids also contribute to the stability of the well bore, and control the flow of gas, oil or water from the pores of the formation in order to prevent, for example, the flow, or in undesired cases, the blow out of formation fluids or the collapse of pressured earth formations. The column of fluid in the hole exerts a hydrostatic pressure proportional to the depth of the hole and the density of the fluid. High-pressure formations may utilize a fluid with a density as high as about 10 pounds per gallon (ppg) and in some instances may be as high as 21 or 22 ppg.

Oil-based muds (OBMs) have been used because of their flexibility in meeting density, inhibition, friction reduction and rheological properties desired in wellbore fluids. The drilling industry has used water-based muds (WBMs) because they are inexpensive. The used mud and cuttings from wells drilled with WBMs can be readily disposed of onsite at most onshore locations. WBMs and cuttings can also be discharged from platforms in many U.S. offshore waters, as long as they meet current effluent limitations guidelines, discharge standards, and other permit limits.

One specific category of wellbore or completion fluids include annular fluids or packer fluids, which are pumped into annular openings in a wellbore such as, for example, (1) between a wellbore wall and one or more casing strings of pipe extending into a wellbore, or (2) between adjacent, concentric strings of pipe extending into a wellbore, or (3) in one or both of an A- or B-annulus in a wellbore comprising at least an A- and B-annulus with one or more inner strings of pipe extending into a said wellbore, which may be running in parallel or nominally in parallel with each other and may or may not be concentric or nominally concentric with the outer casing string, or (4) in one or more of an A-, B- or C-annulus in a wellbore comprising at least an A-, B- and C-annulus with one or more inner strings of pipe extending into a said wellbore, which may be running in parallel or nominally in parallel with each other and may or may not be concentric or nominally concentric with the outer casing string. Yet alternatively, said one or more strings of pipe may simply run through a conduit or outer pipe(s) to connect one or more wellbores to another wellbore or to lead from one or more wellbores to a centralized gathering or processing center; and said annular fluid may have been emplaced within said conduit or pipe(s) but external to said one or more strings of pipe therein.

Such packer fluids primarily serve to protect the casing but also serve to provide hydrostatic pressure in order to equalize pressure relative to the formation, to lower pressures across sealing elements or packers; or to limit differential pressure acting on the well bore, casing and production tubing to prevent collapse of the wellbore, and/or help control a well in the event of a leak in production tubing or when the packer no longer provides a seal or has been unseated. While the packer fluids may be formulated with sufficient density to perform such functions, conventionally, solid weighting agents that are often used in other wellbore fluids are avoided in packer fluids due to the concerns of solid settlement, particularly because packer fluids often remain in the annulus for extended periods of time without circulation. Further, in addition to serving the above mentioned conventional functions, for packer elements that are activated by the packer or annular fluid, the fluid may also be formulated with such additional consideration in mind.

Another category of wellbore or completion fluids include open hole fluids for uncased portions of the well. The fluids are pumped into a vertical or high angle section of a wellbore where the target producing or injection formation often remains exposed during production or injection and/or may include any of the following: swellable packers, external casing packers, perforated liners, sand control screens or sand screens, basepipe, and/or selected inflow control devices which may or may not include gauges, control lines and even submersible pumps. Often, the open hole fluid is spotted in the open hole prior to and functions to facilitate the installation of any of the aforementioned. In the example of a swellable packer/polymer(s), the open hole fluid may provide functionality such that the packer/polymer expands, thus providing a barrier to control pressure, movement of fluids and enhance integrity of the lower installation.

Accordingly, there is a continuing need for improvements in wellbore fluids to have sufficient density and meet other considerations that may be particularly desirable for use with packer elements and/or swellable polymers used in wellbores and open hole.

SUMMARY

In one aspect, embodiments disclosed herein relate to a method for completing a wellbore that includes introducing an oil-containing wellbore fluid into a wellbore having a water-based filtercake on walls thereof; contacting the oil-containing wellbore fluid with an oil-swellable element in the wellbore; and allowing swelling of the oil-swellable element, where the oil-containing wellbore fluid is substantially free of unassociated surfactants, emulsifiers, or dispersants and may include an oleaginous fluid and a weighting agent.

In another aspect, embodiments disclosed herein relate to a method of activating a oil-swellable packer system that includes introducing into a wellbore having a water-based filtercake on the walls thereof an oil-containing wellbore fluid; contacting the oil-containing wellbore fluid with an oil-swellable element in the wellbore; and allowing swelling of the oil-swellable element, where the oil-containing wellbore fluid includes an oleaginous continuous phase, wherein the oleaginous continuous phase forms substantially all of the fluid phase of the oil-containing wellbore fluid; an alkyl diamide, and an organophilic coated weighting agent having a particle size $d_{90}$ of less than about 20 microns.

In yet another aspect, embodiments disclosed herein relate to a wellbore fluid that includes an oleaginous continuous phase, wherein the oleaginous continuous phase forms substantially all of the fluid phase of the wellbore fluid, an alkyl diamide, and an organophilic coated weighting agent having a particle size $d_{90}$ of less than about 20 microns, wherein the wellbore fluid is substantially free of any unassociated surfactants, dispersants, or emulsifiers.

This summary is provided to introduce a selection of concepts that are further described below in the detailed description. This summary is not intended to identify key or essential features of the claimed subject matter, nor is it intended to be used as an aid in limiting the scope of the claimed subject matter. Other aspects and advantages of the present disclosure will be apparent from the following description and the appended claims.

DETAILED DESCRIPTION

Figure 1:
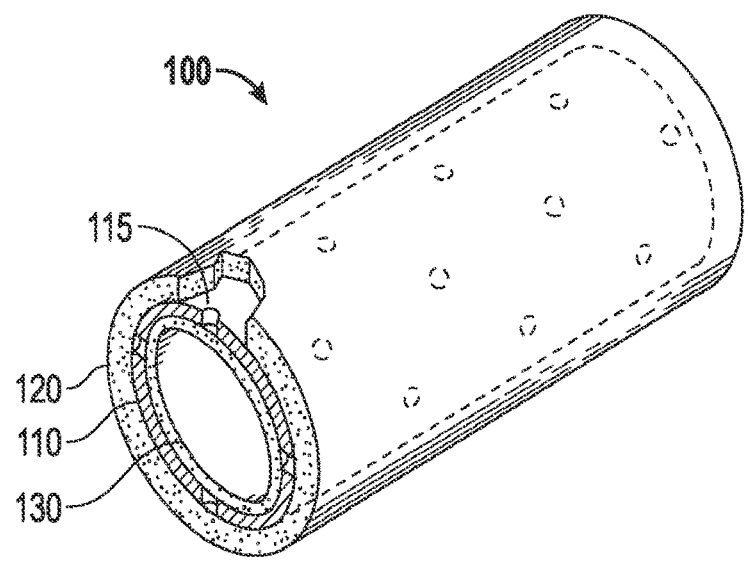
FIG. 1 shows an isometric view of an example system in which embodiments of a sealing member may be implemented.
Figure 2:
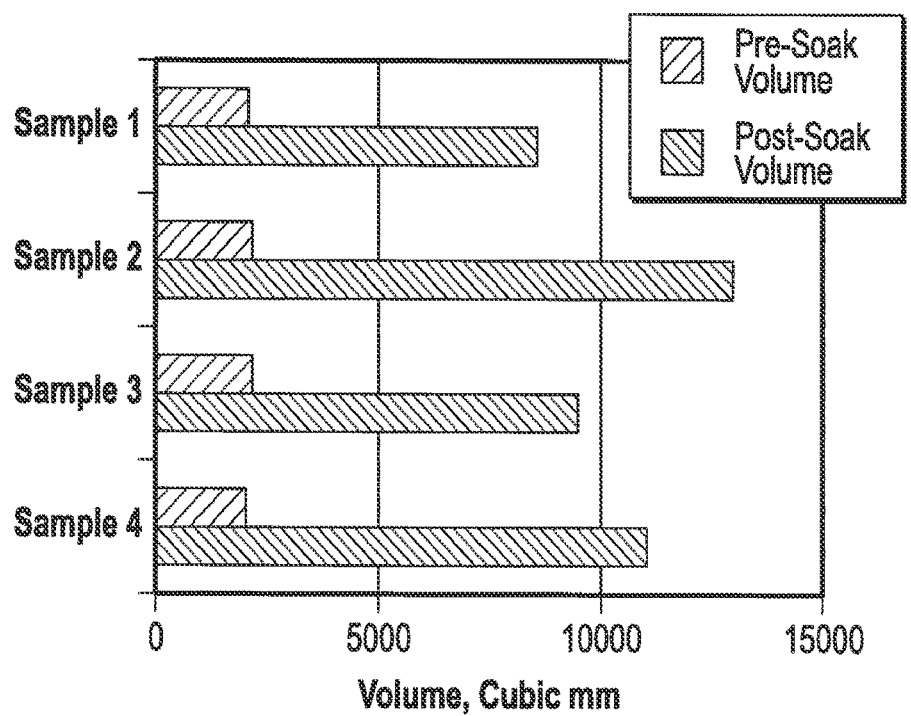
FIG. 2 is a bar graph demonstrating the total volume increase of an oil-swellable packer when soaked in various swelling fluid formulations.

Embodiments disclosed herein relate to wellbore fluids (and methods of using such wellbore fluids) for various completion operations. Particularly, embodiments of the present disclosure relate to wellbore fluids used to activate oil-swellable polymer compositions of a swellable element for a well drilled with a water-based drilling fluid. The oil-swellable elements (and thus wellbore fluids of the present disclosure) may be used in oil-swellable packer system applications such as, but not limited to, completing wells, plugging or abandoning wells, isolating zones of the well, reservoir compartmentalization or wellbore segmentation.

The wellbore fluids of the present disclosure may thus have several components including an oil-containing base fluid, such that there is a sufficient amount of the fluid that is free to diffuse into and swell the polymer, and a weighting agent to weight up the oleaginous fluid so that a higher density may be achieved. The wellbore fluids of the present disclosure may also be used to activate a swellable polymer composition having been placed in the borehole as a packer element, in gravel packing, or other applications discussed herein. The swellable composition may be oil-swellable material, which swells by diffusion of hydrocarbons into the oil-swellable material.

In some embodiments, a wellbore may be drilled using a water-based drilling fluid, where the water-based drilling fluid filters into the formation to form a water-based filtercake. As used herein, a water-based filtercake is a filtercake that is water wet, and may be formed by any water-containing fluid, such as having water or an aqueous fluid as the major fluidic portion of the fluid and/or an any emulsion that produces a water-wet filtercake upon filtration into the formation. In a particular embodiment, the water-based drilling fluid may be displaced with an oil-containing wellbore fluid of the present disclosure, which is allowed to diffuse into oil-swellable materials placed downhole, such as an oil-swellable packer, for example, causing the oil-swellable materials to "activate" or swell.

In another embodiment, the oil-swellable packer may be incorporated in a screen assembly packer for an open hole completion prior to the production of hydrocarbons from a wellbore, in order to utilize the swellable packer to achieve zonal isolation and to block potential undesirable fluid incursion. Such techniques are disclosed in greater detail in U.S. Patent Publication No. 2007/0151724, which is hereby incorporated by reference in its entirety.

As mentioned above, the wellbore fluid used to activate or swell the oil-swellable element may be an oil-containing fluid. In some embodiments, the fluid phase of the oil-containing wellbore fluid is formed solely or substantially entirely of an oleaginous liquid, substantially free of an aqueous component and substantially free of emulsifiers or the like. In another embodiment, the fluid phase of the wellbore fluid is formed of an oleaginous liquid, substantially free of an aqueous component and substantially free of emulsifiers, but may contain some volume of a non-aqueous, non-oleaginous fluid. In yet another embodiment, the oil-containing wellbore fluid may be a direct emulsion where an oleaginous fluid is a discontinuous phase within an aqueous or non-oleaginous continuous phase formulated to be substantially free of emulsifiers or the like.

Swellable Elements

As mentioned above, the wellbore fluid is used to activate a swellable packer system or other swellable elements. Swellable packer systems include a swellable composition that may be used to fill a space in the wellbore. The swellable packer system may comprise the swellable composition alone, but in some embodiments, the swellable packer system includes the swellable composition used as a tool component in completion operations where a packer element is placed in a producing interval of the wellbore to provide annular isolation between an upper and lower section of the well. Frequently, the swellable composition is attached to a base pipe, liner, or even the casing. Swelling of the composition may be initiated at any time, but in some embodiments the composition swells at least after the equipment is installed in the well.

Furthermore, swellable compositions are those that swell or expand when exposed to a specific substance or substances, such as water or hydrocarbons, to a size that is larger than the size of the pre-swelled element. The base fluid of the wellbore fluid used in conjunction with the swellable compositions is absorbed into the swellable packer through diffusion. Through the random thermal motion of the molecules in the liquid, the fluid diffuses into the packer. When the packer is wrapped around the outer circumference of a tubular, the result of swelling is an increase of the manufactured outside diameter of the swellable packer. The fluid may continue to diffuse into the packer causing the packing element to swell so that it reaches the inside diameter of the casing or the open hole of the well, and will continue to swell until the internal stresses inside the packer material reach equilibrium. That is, the swell pressure increases until diffusion can no longer occur. Particularly, the swellable element may swell at least sufficiently such that the swellable element creates a seal in the annulus, such as a differentially sealing annular barrier that is created between upper and lower sections of the well. Optionally, the swellable packer may be used to create a barrier between designated sections of an open hole to allow selective isolation during completion or post completion. In embodiments, the thickness of the swellable element may swell at least 5%, at least 10%, at least 15%, at least 20%, at least 25%, or at least 50%. Often, the swellable element may be constrained to expand in a radial direction, but in other embodiments may expand both radially and axially.

Other embodiments may include a swellable element in a bridge plug, which is a tool that can be located and set in a wellbore in order to isolate a lower part of the wellbore from an upper part of the wellbore.

According to a method of use, a swellable packer or other element, such as a bridge plug may placed in a portion of a wellbore having been drilled, in embodiments, with a water-based fluid such that a water-based filtercake remains on wellbore walls. Of course, more than one swellable element may be placed in the wellbore. A combination of swellable packers and/or bridge plugs may also be placed in portions of a wellbore. A swelling fluid is then introduced directly into the annulus itself, or introduced into the annulus via the tubing string or casing. The swelling fluid may be allowed to contact the swellable element of the packer or bridge plug, which causes the swellable element to begin swelling. The swelling fluid may be allowed to remain in contact with the swellable element for a sufficient time for the swellable element to swell and expand to a sufficient size to seal the annulus.

Swellable compositions used in the methods of the present disclosure may be formed from various materials that sufficiently swell or expand in the presence of hydrocarbons. Illustrative swellable materials may be natural rubbers, nitrile rubbers, hydrogenated nitrile rubber, ethylene-propylene-copolymer rubber, ethylene-propylene-diene terpolymer rubber, butyl rubber, halogenated butyl rubber, brominated butyl rubber, chlorinated butyl rubber, chlorinated polyethylene, starch-polyacrylate acid graft copolymer, polyvinyl alcohol cyclic acid anhydride graft copolymer, isobutylene maleic anhydride, polyacrylates, acrylate butadiene rubber, vinylacetate-acrylate copolymer, polyethylene oxide polymers, carboxymethyl cellulose type polymers, starch-polyacrylonitrile graft copolymers, styrene, styrene-butadiene rubber, polyethylene, polypropylene, ethylene-propylene comonomer rubber, ethylene propylene diene monomer rubber, ethylene vinyl acetate rubber, hydrogenized acrylonitrile-butadiene rubber, acrylonitrile butadiene rubber, isoprene rubber, neoprene rubbers, sulfonated polyethylenes, ethylene acrylate, epichlorohydrin ethylene oxide copolymers, ethylene-proplyene rubbers, ethylene-propylene-diene terpolymer rubbers, ethylene vinyl acetate copolymer, acrylamides, acrylonitrile butadiene rubbers, polyesters, polyvinylchlorides, hydrogenated acrylonitrile butadiene rubbers, fluoro rubber, fluorosilicone rubbers, silicone rubbers, poly 2,2,1-bicyclo heptenes (polynorbornene), alkylstyrenes, or chloroprene rubber. While the specific chemistry is of no limitation to the present methods, oil-swelling polymer compositions may also include oil-swellable elastomers.

Oil-Containing Wellbore Fluids

As mentioned above, to activate the oil-swellable element, i.e., cause the swellable element to swell, the wellbore fluid may be oil-containing. The oil-containing wellbore fluid may contain an amount of an oleaginous fluid sufficient to activate the swellable composition by diffusion of the oleaginous fluid into the oil-swellable material. The amount of oil that will cause sufficient swelling of the swellable element to engage and seal against the corresponding wellbore component may vary, for example, based on the size of the packer, the extent of swelling/expansion of the element required, etc.

In some embodiments, the oil-containing fluids of the present disclosure may include an oleaginous fluid as the continuous phase of the fluid, whereas other embodiments may use a direct emulsion where the oleaginous fluid is a discontinuous phase within an aqueous or non-oleaginous continuous phase.

Oleaginous fluids may be a liquid, such as a natural or synthetic oil and in some embodiments, the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. In a particular embodiment, the fluids may be formulated using diesel oil or a synthetic oil as the external, continuous phase.

In an embodiment, the oleaginous fluid may be present without any aqueous or non-oleaginous phase or may be substantially free of an aqueous and/or non-oleaginous fluid (such as those discussed below). As used herein, substantially free of an aqueous or non-oleaginous fluid may be interpreted to mean that the fluid contains less than 20 vol % of an aqueous or non-oleaginous fluid, or less than 10 vol % or 5 vol % in other embodiments. However, in other embodiments, the fluid may contain a non-aqueous, non-oleaginous fluid having partial miscibility (i.e., some but not total solubility, such as at least 10-25% or greater miscibility) with the oleaginous fluid in an amount that is in excess of 20 vol %. Additionally, mutual solvents, i.e., a fluid having solubility in both aqueous and oleaginous fluids, may be present in the oleaginous fluid, including in the oleaginous fluids that are at least substantially free of an aqueous or non-oleaginous fluid. Illustrative examples of such mutual solvents include for example, isopropanol, diethylene glycol monoethyl ether, dipropylene glycol monomethyl ether, tripropylene butyl ether, dipropylene glycol butyl ether, diethylene glycol butyl ether, butylcarbitol, dipropylene glycol methylether, various esters, such as ethyl lactate, propylene carbonate, butylene carbonate, etc, and pyrolidones.

When formulated without or substantially free of an aqueous or non-oleaginous phase (or even if containing a non-aqueous, non-oleaginous fluid with partial miscibility with an oleaginous fluid), the fluid may also be free or substantially free of any unassociated surfactants, wetting agents, or emulsifiers, i.e., any amphiphilic compounds possessing both hydrophilic and hydrophobic groups within the molecule. As used herein, "unassociated" refers to molecules that are not chemically bound to or otherwise chemically or physically associated with another species (such as a solid weighting agent). Under such definition, a dispersant or wetting agent that is provided as a coating on weighting agent would be considered to be associated, not unassociated. As used herein, substantially free of an unassociated surfactant, wetting agent, or emulsifier means less than an amount that would generate an invert emulsion for any amount of an aqueous or non-oleaginous fluid present in the fluid. Such amounts may, for example, be less than 5 pounds per barrel (ppb) or less than 4 ppb, 3 ppb, 2 ppb, or 1 ppb, in other embodiments. Thus, a wetting agent or dispersant may be provided to coat a solid weighting agent, but the amount added would not be so much that an invert emulsion could be formed with any excess wetting agent or dispersant. Such excess may be less than 5 ppb, 4 ppb, 3 ppb, 2 ppb, or 1 ppb, in various embodiments.

In some embodiments, the wellbore fluid may be a direct emulsion having an aqueous or non-oleaginous fluid as a continuous phase, where the oleaginous fluid is provided as a discontinuous phase provided therein. Direct emulsions may be formulated to be substantially free of an emulsifier, surfactant, dispersant, or wetting agent, as defined above. Non-oleaginous fluids that may be used in the embodiments disclosed herein may be a liquid, such as an aqueous liquid. In embodiments, the non-oleaginous liquid may be selected from the group including fresh water, sea water, a brine containing organic and/or inorganic dissolved salts, liquids containing water-miscible organic compounds and combinations thereof. For example, the aqueous fluid may be formulated with mixtures of desired salts in fresh water. Such salts may include, but are not limited to alkali metal chlorides, hydroxides, or carboxylates, for example. In various embodiments of the wellbore fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a given brine include any one or more of those present in natural seawater or any other organic or inorganic dissolved salts. Additionally, brines that may be used in the wellbore fluids disclosed herein may be natural or synthetic, with synthetic brines tending to be much simpler in constitution. In one embodiment, the density of the wellbore fluid may also be controlled by increasing the salt concentration in the brine (up to saturation). In a particular embodiment, a brine may include halide or carboxylate salts of mono- or divalent cations of metals, such as cesium, potassium, calcium, zinc, and/or sodium. Specific examples of such salts include, but are not limited to, NaCl, $CaCl_2$, NaBr, $CaBr_2$, $ZnBr_2$, $NaHCO_2$, $KHCO_2$, KCl, $NH_4Cl$, $CsHCO_2$, $MgCl_2$, $MgBr_2$, $KH_3C_2O_2$, KBr, $NaH_3C_2O_2$ and combinations thereof.

In the embodiments using direct emulsions, the wellbore fluid may contain an oleaginous fluid (to swell the oil-swellable element) in an amount that has a lower limit of any of 10 vol %, 20 vol %, 30 vol %, 40 vol % or 50 vol %, and an upper limit of any of 40 vol %, 50 vol %, 60 vol %, 70 vol %, or 80 vol %, with any lower limit being combinable with any upper limit. In specific embodiments, the oleaginous fluid may form 20-70 vol % of the wellbore fluid, 30-60 vol %, or 40-50 vol %, with the balance of the fluidic portion being the non-oleaginous fluid.

Solid Weighting Agents

The density of the fluid may be increased by incorporation of a solid weighting agent. Solid weighting agents used in some embodiments disclosed herein may include a variety of inorganic compounds well known to one of skill in the art. In some embodiments, the weighting agent may be selected from one or more of the materials including, for example, barium sulphate (barite), calcium carbonate (calcite or aragonite), dolomite, ilmenite, hematite or other iron ores, olivine, siderite, manganese oxide, and strontium sulphate. In a particular embodiment, calcium carbonate or another acid soluble solid weighting agent may be used.

One having ordinary skill in the art would recognize that selection of a particular material may depend largely on the density of the material because generally the lowest wellbore fluid viscosity at any particular density is obtained by using the highest density particles. In some embodiments, the weighting agent may be formed of particles that are composed of a material of specific gravity of at least 2.3; at least 2.4 in other embodiments; at least 2.5 in other embodiments; at least 2.6 in other embodiments; and at least 2.68 in yet other embodiments. Higher density weighting agents may also be used with a specific gravity of about 4.2, 4.4 or even as high as 5.2. For example, a weighting agent formed of particles having a specific gravity of at least 2.68 may allow wellbore fluids to be formulated to meet most density requirements yet have a particulate volume fraction low enough for the fluid to be pumpable. However, other considerations may influence the choice of product such as cost, local availability, the power required for grinding, and whether the residual solids or filtercake may be readily removed from the well. In particular embodiments, the wellbore fluid may be formulated with calcium carbonate or another acid-soluble material.

The solid weighting agents may be of any particle size (and particle size distribution), but some embodiments may include weighting agents having a smaller particle size range than API grade weighing agents, which may generally be referred to as micronized weighting agents. Such weighting agents may generally be in the micron (or smaller) range, including submicron particles in the nanosized range.

In some embodiments, the average particle size (d50) of the weighting agents may range from a lower limit of greater than 5 nm, 10 nm, 30 nm, 50 nm, 100 nm, 200 nm, 500 nm, 700 nm, 0.5 micron, 1 micron, 1.2 microns, 1.5 microns, 3 microns, 5 microns, or 7.5 microns to an upper limit of less than 500 nm, 700 microns, 1 micron, 3 microns, 5 microns, 10 microns, 15 microns, 20 microns, where the particles may range from any lower limit to any upper limit. In other embodiments, the d90 (the size at which 90% of the particles are smaller) of the weighting agents may range from a lower limit of greater than 20 nm, 50 nm, 100 nm, 200 nm, 500 nm, 700 nm, 1 micron, 1.2 microns, 1.5 microns, 2 microns, 3 microns, 5 microns, 10 microns, or 15 microns to an upper limit of less than 30 microns, 25 microns, 20 microns, 15 microns, 10 microns, 8 microns, 5 microns, 2.5 microns, 1.5 microns, 1 micron, 700 nm, 500 nm, where the particles may range from any lower limit to any upper limit. The above described particle ranges may be achieved by grinding down the materials to the desired particle size or by precipitation of the material from a bottoms up assembly approach. Precipitation of such materials is described in U.S. Patent Application Publication No. 2010/009874, which is assigned to the present assignee and herein incorporated by reference. One of ordinary skill in the art would recognize that, depending on the sizing technique, the weighting agent may have a particle size distribution other than a monomodal distribution. That is, the weighting agent may have a particle size distribution that, in various embodiments, may be monomodal, which may or may not be Gaussian, bimodal, or polymodal.

In one embodiment, a weighting agent is sized such that: particles having a diameter less than 1 microns are 0 to 15 percent by volume; particles having a diameter between 1 microns and 4 microns are 15 to 40 percent by volume; particles having a diameter between 4 microns and 8 microns are 15 to 30 by volume; particles having a diameter between 8 microns and 12 microns are 5 to 15 percent by volume; particles having a diameter between 12 microns and 16 microns are 3 to 7 percent by volume; particles having a diameter between 16 microns and 20 microns are 0 to 10 percent by volume; particles having a diameter greater than 20 microns are 0 to 5 percent by volume. In another embodiment, the weighting agent is sized so that the cumulative volume distribution is: less than 10 percent or the particles are less than 1 microns; less than 25 percent are in the range of 1 microns to 3 microns; less than 50 percent are in the range of 2 microns to 6 microns; less than 75 percent are in the range of 6 microns to 10 microns; and less than 90 percent are in the range of 10 microns to 24 microns.

The use of weighting agents having such size distributions has been disclosed in U.S. Patent Application Publication Nos. 2005/0277553 and 2010/0009874, which are assigned to the assignee of the current application, and herein incorporated by reference. Particles having these size distributions may be obtained any means known in the art.

In some embodiments, the weighting agents include dispersed solid colloidal particles with a weight average particle diameter (d50) of less than 10 microns that are coated with an organophilic, polymeric deflocculating agent or dispersing agent. In other embodiments, the weighting agents include dispersed solid colloidal particles with a weight average particle diameter (d50) of less than 8 microns that are coated with a polymeric deflocculating agent or dispersing agent; less than 6 microns in other embodiments; less than 4 microns in other embodiments; and less than 2 microns in yet other embodiments. The fine particle size will generate suspensions or slurries that will show a reduced tendency to sediment or sag, and the polymeric dispersing agent on the surface of the particle may control the inter-particle interactions and thus will produce lower rheological profiles. It is the combination of fine particle size and control of colloidal interactions that reconciles the two objectives of lower viscosity and minimal sag.

In some embodiments, the weighting agents may be uncoated. In other embodiments, the weighting agents may be coated with an organophilic coating such as a dispersant, including carboxylic acids of molecular weight of at least 150 Daltons, such as oleic acid, stearic acid, and polybasic fatty acids, alkylbenzene sulphonic acids, alkane sulphonic acids, linear alpha-olefin sulphonic acid, and alkaline earth metal salts thereof. Further examples of suitable dispersants may include a polymeric compound, such as a polyacrylate ester composed of at least one monomer selected from stearyl methacrylate, butylacrylate and acrylic acid monomers. The illustrative polymeric dispersant may have an average molecular weight from about 10,000 Daltons to about 200,000 Daltons and in another embodiment from about 17,000 Daltons to about 30,000 Daltons. One skilled in the art would recognize that other acrylate or other unsaturated carboxylic acid monomers (or esters thereof) may be used to achieve substantially the same results as disclosed herein.

In embodiments, the coated weighting agents may be formed by either a dry coating process or a wet coating process. Weighting agents suitable for use in other embodiments disclosed herein may include those disclosed in U.S. Patent Application Publication Nos. 2004/0127366, 2005/0101493, 2006/0188651, 2008/0064613, and U.S. Pat. Nos. 6,586,372 and 7,176,165, each of which is hereby incorporated by reference.

The particulate materials as described herein (i.e., the coated and/or uncoated weighting agents) may be added to a wellbore fluid as a weighting agent in a dry form or concentrated as slurry in either an aqueous medium or as an organic liquid. As is known, an organic liquid may have the environmental characteristics required for additives to oil-containing wellbore fluids. With this in mind, the oleaginous fluid may have a kinematic viscosity of less than 10 centistokes (10 mm2/s) at 40° C. and, for safety reasons, a flash point of greater than 60° C. Suitable oleaginous liquids are, for example, diesel oil, mineral or white oils, n-alkanes or synthetic oils such as alpha-olefin oils, ester oils, mixtures of these fluids, as well as other similar fluids known to one of skill in the art of drilling or other wellbore fluid formulation. In one embodiment, the desired particle size distribution is achieved via wet milling of the coarser materials in the desired carrier fluid.

Such solid weighting agents may be particularly useful in wellbore fluids formulated with an entirely oleaginous fluid phase. In a particular embodiment, an organophilic coated weighting agent having a particle size within any of the described ranges may be used in a fluid free of or substantially free of an aqueous phase contained therein. Solid weighting agents may also be used in the direct emulsion emulsions of the present disclosure to provide additional density beyond that provided by the aqueous phase as needed.

In an embodiment, the wellbore fluid may have a density of greater than about 8.0 pounds per gallon (ppg), or at least 10, 12, or 14 ppg in other embodiment. In yet another embodiment the density of the wellbore fluid in some embodiments ranges from about 6 to about 18 ppg, where the weighting agent is added in an amount to increase the density of the base fluid by at least 1 ppg or by at least 2, 4, or 6 ppg in other embodiments.

Wellbore Fluid Additives

Other additives that may be included in the wellbore fluids disclosed herein include, for example, wetting agents, organophilic clays, viscosifiers, fluid loss control agents, surfactants, dispersants, interfacial tension reducers, pH buffers, mutual solvents, thinners, thinning agents, and cleaning agents. The addition of such agents should be well known to one of ordinary skill in the art of formulating wellbore fluids and muds.

In some embodiments, additives may be included in the composition to modify rheological properties, such as viscosity and flow. For example, organic thixotropes suitable for addition to wellbore fluids of the present disclosure include alkyl diamides, such as those having a general formula: R1-HN—CO—(CH$_2$)$_n$—CO—NH—R2, wherein n is an integer from 1 to 20, from 1 to 4, or from 1 to 2, and R1 is an alkyl group having from 1 to 20 carbons, from 4 to 12 carbons, or 5 to 8 carbons, and R2 is hydrogen or an alkyl group having from 1 to 20 carbons, or is hydrogen or an alkyl group having from 1 to 4 carbons, wherein R1 and R2 may or may not be identical. Such alkyl diamides as those under the trade name of VERSAPAC™ may be obtained, from M-I L.L.C. (Houston, Tex.). Such alkyl diamide viscosifier may be particularly suitable for use in an oil-containing wellbore fluid substantially free of an aqueous or non-oleaginous fluid, but may also be included in direct emulsion.

In other embodiments, organophilic clays, such as amine treated clays, may be useful as viscosifiers in the fluid composition of the present disclosure. Organoclay materials such as those sold under the trademark VG-69™ and VG-PLUS™, available from M-I L.L.C., Houston, Tex., that may be used in embodiments disclosed herein. Such organophilic clays, as well as water-based clays may be particularly useful in assisting in the formation and stabilization of a direct emulsion. Other viscosifiers that may be used include partially hydrolyzed polyacrylamide (PHPA), biopolymers (such as guar gum, starch, xanthan gum and the like), bentonite, attapulgite, sepiolite, polyamide resins, polyanionic carboxymethylcellulose (PAC or CMC), polyacrylates, lignosulfonates, as well as other water soluble polymers.

When formulating a direct emulsion without an emulsifier, surfactant, etc., the viscosifier may be incorporated to increase the viscosity and thus miscibility of the two phases, such that a direct (oil-in-water) emulsion is formed upon mixing in a high shear mixer, as that term is understood by those of ordinary skill in the art, operating at at least 3500 rpm, or at least 5000 or 7000 rpm in other embodiments.

In other embodiments, fumed silicas and/or precipitated silica may be used as a viscosifying agent. In yet other embodiments, precipitated silicas may advantageously be used to provide both weighting and viscosifying of the oleaginous base fluid. When used to provide weighting and visocifying, the precipitated silicas may be used in addition to or in place of the weighting agents described above. Alternatively, the relative amounts of the weighting agent and the precipitated silica in the wellbore fluid formulation may be adjusted such that the wellbore fluid has both the desired density and flow properties.

Precipitated silicas have a porous structure and may be prepared from the reaction of an alkaline silicate solution with a mineral acid. Alkaline silicates may be selected, for example, from one or more of sodium silicate, potassium silicate, lithium silicate and quaternary ammonium silicates. Precipitated silicas may be produced by the destabilization and precipitation of silica from soluble silicates by the addition of a mineral acid and/or acidic gases. The reactants thus include an alkali metal silicate and a mineral acid, such as sulfuric acid, or an acidulating agent, such as carbon dioxide. Precipitation may be carried out under alkaline conditions, for example, by the addition of a mineral acid and an alkaline silicate solution to water with constant agitation. The choice of agitation, duration of precipitation, the addition rate of reactants, temperature, concentration, and pH may vary the properties of the resulting silica particles.

Precipitated silicas useful in embodiments herein may include finely-divided particulate solid materials, such as powders, silts, or sands, as well as reinforced flocs or agglomerates of smaller particles of siliceous material. In some embodiments, the precipitated silica (or agglomerates thereof) may have an average particle size ($D_{50}$) of less than 100 microns; less than 50 microns in other embodiments; and in the range from about 1 micron to about 40 microns, such as about 25 to about 35 microns, in yet other embodiments. In some embodiments, precipitated silicas having a larger initial average particle size may be used, where shear or other conditions may result in comminution of the particles, such as breaking up of agglomerates, resulting in a silica particle having a useful average particle size.

Precipitated silicas may contain varying amounts of residual alkali metal salts that result from the association of the corresponding silicate counterion with available anions contributed by the acid source. Residual salts may have the basic formula MX, where M is a group 1 alkali metal selected from Li, Na, K, Cs, a group 2 metal selected from Mg, Ca, and Ba, or organic cations such as ammonium, tetraalkyl ammonium, imidazolium, alkyl imidazolium, and the like; and X is an anion selected from halides such as F, Cl, Br, I, and/or sulfates, sulfonates, phosphonates, perchlorates, borates, and nitrates. In an embodiment, the residual salts may be selected from one or more of $Na_2SO_4$ and NaCl, and the precipitated silica may have a residual salt content (equivalent Na2SO4) of less than about 2 wt. %. While the pH of the resulting precipitated silicas may vary, embodiments of the silicas useful in embodiments disclosed herein may have a pH in the range from about 6.5 to about 9, such as in the range from about 6.8 to about 8.

In other embodiments, surface-modified precipitated silicas may be used. The surface-modified precipitated silica may include a lipophilic coating, for example. The surface modification may be added to the silica after precipitation. Alternatively, the silica may be precipitated in the presence of one or more of the surface modification agents described above.

It has been found that surface-modified precipitated silicas according to embodiments herein may advantageously provide for both weighting and viscosifying of the oleaginous base fluid. Precipitated silicas according to embodiments herein are useful for providing wellbore fluids having enhanced thermal stability in temperature extremes, while exhibiting a substantially constant rheological profile over time.

In some embodiments, the surface of the silica particles may be chemically modified by a number of synthetic techniques. Surface functionality of the particles may be tailored to improve solubility, dispersibility, or introduce reactive functional groups. This may be achieved by reacting the precipitated silica particles with organosilanes or siloxanes, in which reactive silane groups present on the molecule may become covalently bound to the silica lattice that makes up the particles. Non-limiting examples of compounds that may be used to functionalize the surface of the precipitated silica particles include aminoalkylsilanes such as aminopropyltriethoxysilane, aminomethyltriethoxysilane, trimethoxy[3-(phenylamino)propyl]silane, and trimethyl[3-(triethoxysilyl)propyl]ammonium chloride; alkoxyorganomercapto silanes such as bis(3-(triethoxysilylpropyl) tetrasulfide, bis(3-(triethoxysilylpropyl)disulfide, vinyltrimethoxy silane, vinyltriethoxy silane, 3-mercaptopropyltrimethoxy silane; 3-mercaptopropyltriethoxy silane; 3-aminopropyltriethoxysilane and 3-aminopropyltrimethoxysilane; and alkoxysilanes.

In other embodiment, organo-silicon materials that contain reactive end groups may be covalently linked to the surface of the silica particles. Reactive polysiloxanes may include, for example, diethyl dichlorosilane, phenyl ethyl diethoxy silane, methyl phenyl dichlorosilane, 3,3,3-trifluoropropylmethyl dichlorosilane, trimethylbutoxy silane, sym-diphenyltetramethyl disiloxane, octamethyl trisiloxane, octamethyl cyclotetrasiloxane, hexamethyl disiloxane, pentamethyl dichlorosilane, trimethyl chlorosilane, trimethyl methoxysilane, trimethyl ethoxysilane, methyl trichlorosilane, methyl triethoxysilane, methyl trimethoxysilane, hexamethyl cyclotrisiloxane, hexamethyldisiloxane, hexaethyldisiloxane, dimethyl dichlorosilane, dimethyl dimethoxy silane, dimethyl diethoxysilane, polydimethylsiloxanes comprising 3 to 200 dimethylsiloxy units, trimethyl siloxy or hydroxydimethylsiloxy end blocked poly(dimethylsiloxane) polymers (silicone oils) having an apparent viscosity within the range of from 1 to 1000 mPascals at 25° C., vinyl silane, gamm-methacryloxypropyl trimethoxy silane, polysiloxanes, e.g., polysiloxane spheres, and mixtures of such organo-silicone materials.

The surface-modified precipitated silicas may have a BET-5 nitrogen surface area of less than about 200 $m^2/g$. In some embodiments, the surface area of the surface-modified precipitated silica may be less than about 150 $m^2/g$. In other embodiments, the surface area may be in the range from about 20 $m^2/g$ to about 70 $m^2/g$.

In one or more embodiments, the precipitated silica has a BET-5 nitrogen surface area of 20 $m^2/g$ to 70 $m^2/g$, as calculated from the surface adsorption of $N_2$ using the BET-1 point method, a pH in the range of pH 7.5 to pH 9, and an average particle diameter in the range of 20 nm to 100 nm.

In some embodiments, precipitated silicas useful in embodiments herein may include those as disclosed in U.S. Patent Application Publication Nos. 2010/0292386, 2008/0067468, 2005/0131107, 2005/0176852, 2006/0225615, 2006/0228632, and 2006/0281009, each of which is incorporated herein by reference.

Another additive to oleaginous wellbore fluids that may optionally be included in the oleaginous wellbore fluids disclosed herein is a fluid loss control agent. Fluid loss control agents may act to prevent the loss of fluid to the surrounding formation by reducing the permeability of the barrier of solidified wellbore fluid. Suitable fluid loss control agents may include those such as modified lignites, asphaltic compounds, gilsonite, organophilic humates prepared by reacting humic acid with amides or polyalkylene polyamines, and other fluid loss additives such as a methylstyrene/acrylate copolymer. Such fluid loss control agents may be employed in an amount which is at least from about 0.5 to about 15 pounds per barrel. The fluid-loss reducing agent should be tolerant to elevated temperatures, and inert or biodegradable. An oil-soluble polymeric fluid control agent under the trademark ECOTROL RD™ that may be used in the wellbore fluid, is commercially available from M-I L.L.C., Houston, Tex.

To illustrate an embodiment of a well completion with a swellable packer system, an annular sealing member (packer) is deployed in a wellbore. FIG. 1 depicts an embodiment of an annular sealing member 100 including portions made of the swellable composition. The sealing member 100 can include a support member 110 having an outer swellable element 120 disposed about an outer diameter thereof. The support member 110 can also have an inner swellable element 130 disposed about an inner diameter thereof. The support member 110 can have apertures 115 formed therethrough allowing the outer swellable element 120 to unitize with the inner swellable element 130.

The outer swellable element 120 can be disposed about the support member 110 and can be configured to engage a wall of a wellbore or other structure disposed about the outer swellable element 120. The inner swellable element 130 can be configured to swell within the support member 110 about a tubular or other object at least partially disposed within the support member 110. The swellable elements 120 and 130 are unitized, allowing the sealing member 100 to resist differential pressure. The swellable elements 120 and 130 can be made of the swellable composition.

After the sealing member 100 is placed in the wellbore around a tubing or drill string (along with any other completion equipment), an oil-containing wellbore fluid (such as any of those described above) is formed by mixing a base fluid with a weighting agent (such as a micronized weighting agent) along with additives that provide for the proper rheological properties required for the well. The wellbore fluid is then pumped downhole (either directly into the annulus or through a tubing string) and allowed to come into contact with the swellable elements placed in the wellbore (previously or subsequently placed therein). In a particular embodiment, the oil-containing wellbore fluid may displace a water-based wellbore fluid used to drill at least a portion of the wellbore. Such displacement may occur with or without the use of spacer fluids, as known in the art, but without any washing or breaker fluids. Alternatively, in other embodiments, the water based drilling fluid may be first displaced with a conditioned mud, a solids free mud, or a brine prior to introduction to the oil-containing fluid of the present disclosure. Thus, the oil-containing fluid may be pumped into a wellbore having a water-based filter cake on the walls thereof, without the water-based filter cake being removed and the well otherwise being cleaned. The oil-containing fluid may diffuse into the oil-swellable elements 120 and 130, which may swell until the internal stresses inside the polymer reach equilibrium. That is, the swell pressure increases until diffusion can no longer occur. At this point a differentially sealing annular barrier is created between upper and lower sections of the well. In some embodiments, the oil-containing fluid of the present disclosure is introduced into an uncased portion of the well, below the packer element. Other embodiments may involve introduction of the oil-containing fluid above the packer element or both above and below the packer element.

As used herein, a "well" includes at least one wellbore drilled into a subterranean formation, which may be a reservoir or adjacent to a reservoir. A wellbore may have vertical and horizontal portions, and it may be straight, curved, or branched. The wellbore may be an open-hole or cased-hole. In an open-hole wellbore, a tubing string, which allows fluids to be placed into or removed from the wellbore, is placed into the wellbore. In a cased-hole, a casing is placed into the wellbore, and a tubing string can be placed in the casing. An annulus is the space between two concentric objects, such as between the wellbore and casing, or between casing and tubing, where fluid can flow.

Annular sealing members suitable for use in other embodiments disclosed herein may include, but are not limited to, those disclosed in U.S. Patent Application Publication Nos. 2007/0151724, 2007/0205002, 2008/0308283, and U.S. Pat. Nos. 7,143,832 and 7,849,930, each of which is hereby incorporated by reference in their entirety. Sealing members can also be used in combination with any other tools where isolation of wellbore segments is desired.

While the illustrated embodiment is one example of many potential applications, it is provided for purposes of explanation. Many other types of applications utilizing a variety of completion equipment, gravel pack techniques and wellbore orientations can benefit from the swellable packer system described. In another embodiment of a well completion, the packer may be incorporated in a screen assembly packer for an open hole completion to utilize the swellable packer to achieve zonal isolation and to block potential undesirable fluid incursion as disclosed in U.S. Patent Application Publication No. 2007/0151724, which is hereby incorporated by reference in its entirety.

EXAMPLES

As mentioned above, the oil-containing fluids of the present disclosure may be used to swell an oil-swellable packer composition that is used in a wellbore having been drilled with a water-based drilling fluid, where there is residual water-based fluid in the form of a water-based filtercake remaining in the well. Such fluids may include any water-based drilling fluid known in the art, which may contain an aqueous fluid (such as those described above) forming substantially all of the fluidic portion of the fluid, one or more solid particles including bridging agents or weighting agents known in the art, fluid loss control and/or viscosifiers, such as xanthan or other natural or synthetic polymers, as well as other additives known in the art of drilling fluids.

Example 1

In order to measure the effectiveness of the oil-containing wellbore fluids for activating an oil-swellable packer, four wellbore fluid formulations were prepared. Mixed in the various proportions, the samples included the following components: diesel, water, dry calcium chloride, lime; a calcium carbonate weighting agent under the trademark SAFE-CARB™ 2; an oil-soluble methylstyrene/acrylate copolymer under the trademark ECOTROL RD™; lime; an organophilic clay viscosifier under the trademark VG-PLUS™; a modified amidoamine derived from fatty acids emulsifier and wetting agent under the trademark VERSCOAT™; an oxidized fatty acid surfactant under the trademark VERSAWET™; a blend of fatty acids and tall oil emulsifier for oil based muds under the trademark VERSAMUL™; an alkoxylated fatty alcohol terminated with an carboxylic acid emulsifier under the trade name ECF-2184; an alkyl diamide under the trademark VERSAPAC™; and a micronized calcium carbonate weighting agent under the trade name EMI-2180 having a d90 of about 10 microns, a d50 of about 4 microns, and a d10 of about 1.5 coated with an organophilic coating made from stearyl methacrylate, butylacrylate and acrylic acid monomers, all of which are available from M-I LLC (Houston, Tex.). The fluid formulations are as follows:

TABLE 1

Formulations for oil-swellable packer fluids

| | Sample | | | |
|---|---|---|---|---|
| | 1 | 2 | 3 | 4 |
| Diesel, bbl | 1 | 0.053 | 0.31 | 0.82 |
| Water, bbl | — | 0.322 | 0.585 | — |
| Dry Calcium Chloride, lb | — | 38.37 | 93.74 | — |
| Lime, lb | — | 6 | 6 | — |
| ECOTROL RD, lb | — | 1 | — | — |
| VG-PLUS, lb | — | 2 | — | — |
| VERSACOAT, lb | — | 6 | — | — |
| VERSAWET, lb | — | 4 | — | — |
| VERSAMUL, lb | — | — | 6 | — |
| ECF-2184 | — | — | 1.5 | — |
| VERSAPAC, lb | — | — | — | 2 |
| SAFE-CARB 2, lb | — | 76.82 | — | — |
| EMI-2180, lb | — | — | — | 155.49 |

Diesel oil was used as a control in Sample 1. A conventional 60:40 oil-to-water ratio (OWR) invert system was blended for Sample 2 using a modified amidoamine derived from fatty acids emulsifier and wetting agent under the trademark VERSCOAT™, an oxidized fatty acid surfactant under the trademark VERSAWET™ in order to oil-wet the system and maintain an invert emulsion with the brine phase, and a calcium carbonate weighting agent under the trademark SAFE-CARB™ 2, as the weighting agent. In addition, a high internal phase ratio (HIPR) emulsion was prepared for Sample 3 containing no solids and a special emulsifier that maintains a water-in-oil system at very low OWR not possible using conventional chemistry. Finally, Sample 4 is an all-oil system prepared with the organic alkyl diamide viscosifier to achieve suspension of the organophilic coated calcium carbonate weighting agent, which may decrease or eliminate the need for an emulsifier or wetting agent within the fluid.

Swelling assays were conducted in which portions of Samples 1-4, referred to as "soak fluid" in Table 2, were loaded into pressurized cells with a coupon of an oil-swellable packer material and placed in an oven for static aging at 225° F. (107° C.) for 24 hours. Following the static incubation time, cells were removed, air-cooled, and measured. Sample 1, the diesel oil control, was poured into a jar containing a coupon sample and aged for 24 hours at room temperature because it was not possible to test the fluid at elevated temperature due to safety considerations. The results are shown in Table 2 and FIG. 1.

TABLE 2

Calculated change in oil-swellable packer coupon size after exposure to various oil-based fluids.

| Soak Fluid | Length, mm | | Width, mm | | Thickness, mm | | Volume, mm³ | |
|---|---|---|---|---|---|---|---|---|
| | Initial | Final | Initial | Final | Initial | Final | Initial | Final |
| 1 | 38.08 | 57.65 | 25.58 | 37.58 | 2.13 | 3.95 | 2074.80 | 8557.62 |
| 2 | 38.25 | 64.49 | 25.66 | 41.97 | 2.20 | 4.80 | 2159.29 | 12991.90 |
| 3 | 38.23 | 59.56 | 25.66 | 40.94 | 2.20 | 3.89 | 2158.16 | 9485.32 |
| 4 | 38.06 | 61.45 | 25.44 | 42.56 | 2.08 | 4.22 | 2013.95 | 11036.62 |

Example 2

To determine the increase in fluid properties of the all-oil packer swelling fluid under high temperature downhole conditions, two different variations of 9.6 lb/gal volumes of Sample 4 were mixed as shown in Table 3. The fluid was sheared on the Silverson mixer controlling associated heat with a cooling bath to maintain the temperature below 150° F. (66° C.). Viscosity data for both formulations are shown in Table 4. In both samples of Sample 4, an increase in the rheology was observed after static aging at 225° F. (107° C.) for 24 hours.

TABLE 3

Formulations for Sample 4 Variation Systems

| Product | Sample 4-1 | Sample 4-2 |
|---|---|---|
| Diesel, bbl | 0.82 | 0.82 |
| VERSAPAC, lb | 2 | 2.5 |
| EMI-2180, lb | 155.76 | 155.62 |

TABLE 4

Rheology for 9.6 lb/gal Sample 4 Variation Systems

| Fann 35 | Sample 4-1 | | Sample 4-2 | |
|---|---|---|---|---|
| Reading | Initial (cP) | Post Aging (cP) | Initial (cP) | Post-Aging (cP) |
| 600 | 21 | 27 | 24 | 44 |
| 300 | 15 | 18 | 16 | 30 |
| 200 | 12 | 15 | 13 | 26 |
| 100 | 9 | 12 | 11 | 21 |
| 6 | 6 | 8 | 7 | 15 |
| 3 | 5 | 7 | 6 | 14 |
| 10" | 6 | 12 | 7 | 14 |
| 10' | 7 | 13 | 8 | 15 |

Example 3

In order to demonstrate the compatibility of the oil-containing packer swelling fluid Sample 4 relative to a conventional invert emulsion fluid, a filtercake was generated using a water-based reservoir drill-in fluid on an aloxite disc at 220° F. (104° C.). The cell was emptied of drilling fluid and replaced with Sample 4-1 (Table 3), in contact of the water-based filtercake. This procedure was repeated for a second cell, using a conventional invert emulsion, i.e., Sample 2. The cells were pressurized to 100 psi and heated to 150° F. for 24 hours. The cells were then removed and allowed to cool to room temperature.

Figure 3B:
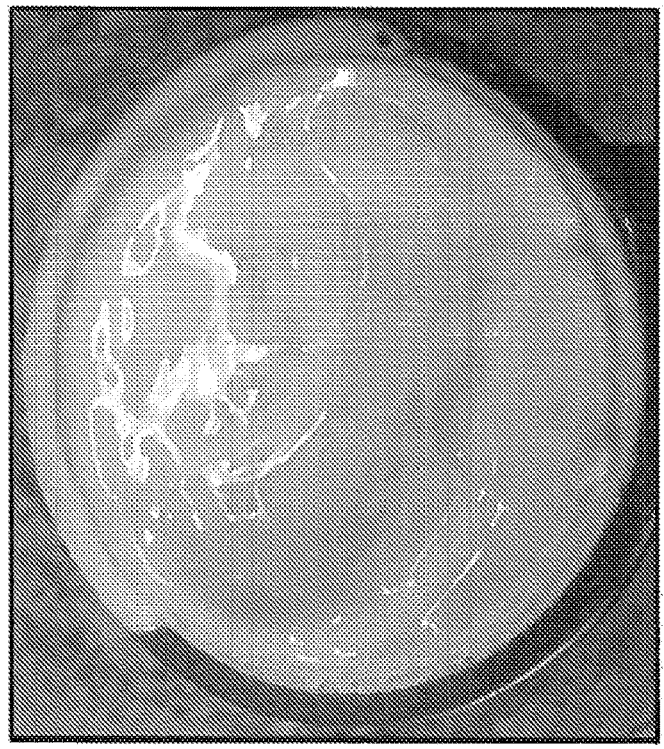
FIG. 3 is a photograph demonstrating the compatibility of two swelling fluid formulations with a water-based filtercake.
Figure 3A:
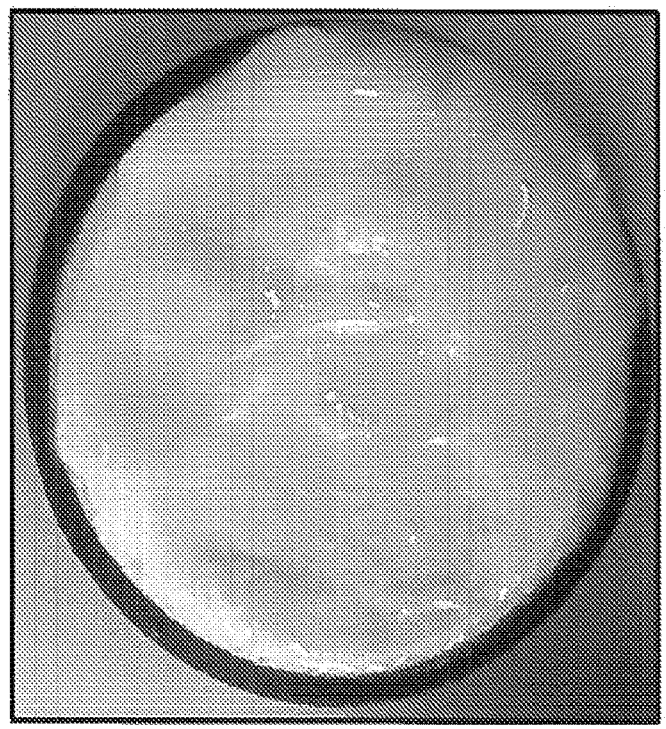

Cells were disassembled and the filtercakes were removed and photographed. An emulsion was observed on the water-based filtercake exposed to the invert emulsion fluid (Pane B, FIG. 3), which may be attributed to the degradation of the filtercake by emulsifiers used to stabilize the invert emulsion. The filtercake exposed to the all-oil system (and free of any emulsifiers or wetting agents) of Sample 4 (Pane A, FIG. 3) did not exhibit signs of emulsion formation.

Embodiments of the present disclosure relate to a wellbore fluid that may be used in the completion of a well. For wells having been drilled with a water-based fluid, the present disclosure may advantageously allow for the use of an oil-swellable packer that may have better sealing characteristics than a water-swellable packer. Further, embodiments of the present disclosure may also allow for the use of an oil-containing fluid that can be weighted to a specified density (for well control) without risk of particle settlement. Further, in an embodiment using an all-oil system or a direct emulsion, as described herein, the elimination or reduced amount of the emulsifier, surfactants, or wetting agents may be desirable to minimize the interaction between the water-based filtercake and the oil-containing wellbore fluid, thus simplifying displacement logistics between water- and oil-containing fluids.

While the present disclosure has been described with respect to a limited number of embodiments, those skilled in the art, having benefit of this disclosure, will appreciate that other embodiments may be devised which do not depart from the scope of the disclosure as disclosed herein. Accordingly, the scope of the invention should be limited only by the attached claims.

Although a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for completing a wellbore comprising:
    introducing an oil-containing wellbore fluid into a wellbore having a water-based filtercake on walls thereof, the oil-containing wellbore fluid being substantially free of unassociated surfactants, emulsifiers, or dispersants, the wellbore fluid comprising:
        an oleaginous fluid forming the continuous phase; and
        a weighting agent,
        wherein being substantially free of unassociated surfactants, emulsifiers, or dispersants means less than an amount that would generate an invert emulsion for any amount of an aqueous or non-oleaginous fluid present in the fluid;
    contacting the oil-containing wellbore fluid with an oil-swellable element in the wellbore; and
    allowing swelling of the oil-swellable element.

2. The method of claim 1, further comprising: drilling the wellbore with a water-based wellbore fluid to form the water-based filtercake on walls thereof.

3. The method of claim 2, further comprising displacing the water-based wellbore fluid with the oil-containing wellbore fluid.

4. The method of claim 1, wherein the oil-swellable element is disposed on an outer circumference of a tubular component.

5. The method of claim 1, further comprising positioning the oil-swellable element in an uncased interval of the wellbore.

6. The method of claim 1, wherein the oil-containing wellbore fluid has less than 10 vol % of an aqueous fluid.

7. The method of claim 1, wherein the oleaginous fluid forms at least 50 vol % of the fluid phase of the oil-containing wellbore fluid, and wherein the fluid phase optionally comprises a non-aqueous, non-oleaginous fluid.

8. The method of claim 1, wherein the oil-containing wellbore fluid further comprises an alkyl diamide having the general formula: $R^1$—HN—CO—$(CH_2)_n$—CO—NH—$R^2$, wherein n is an integer from 1 to 20, $R^1$ is an alkyl group having from 1 to 20 carbons, and $R^2$ is hydrogen or an alkyl group having from 1 to 20 carbons, wherein $R^1$ and $R^2$ may or may not be identical.

9. The method of claim 1, wherein the oil-containing wellbore fluid has a density greater than 8.0 ppg.

10. The method of claim 1, wherein the weighting agent is selected from at least one of barite, calcium carbonate, dolomite, ilmenite, hematite, olivine, siderite, manganese oxide, hausmannite, and strontium sulfate.

11. The method of claim 1, wherein the weighting agent has a particle size $d_{90}$ of less than about 20 microns.

12. The method of claim 1, wherein the weighting agent has a particle size $d_{90}$ of less than about 10 microns.

13. The method of claim 1, wherein the weighting agent has a particle size $d_{90}$ of less than about 5 microns.

14. The method of claim 1, wherein the weighting agent has an organophilic coating thereon.

15. The method of claim 14, wherein the organophilic coating comprises at least one selected from oleic acid, stearic acid, polybasic fatty acids, alkylbenzene sulfonic acids, alkane sulfonic acids, linear alpha-olefin sulfonic acids, alkaline earth metal salts thereof, polyacrylate esters, and phospholipids.

16. The method of claim 1, wherein the wellbore fluid further comprises a silica.

17. The method of claim 1, wherein the wellbore fluid further comprises at least one of a fumed silica and a precipitated silica.

18. The method of claim 1, wherein the wellbore fluid further comprises a surface-modified precipitated silica.

19. A method comprising:
    introducing into a wellbore having a water-based filtercake on the walls thereof an oil-containing wellbore fluid, the oil-containing wellbore fluid comprising:
        an oleaginous continuous phase, wherein the oleaginous continuous phase forms substantially all of the fluid phase of the oil-containing wellbore fluid,
        an alkyl diamide, and
        an organophilic coated weighting agent having a particle size d90 of less than about 20 microns;
    contacting the oil-containing wellbore fluid with an oil-swellable element in the wellbore; and
    allowing swelling of the oil-swellable element.

20. The method of claim 19, wherein the alkyl diamide has the general formula: $R^1$—HN—CO—$(CH_2)_n$—CO—NH—$R^2$, wherein n is an integer from 1 to 20, $R^1$ is an alkyl group having from 1 to 20 carbons, and $R^2$ is hydrogen or an alkyl group having from 1 to 20 carbons, wherein $R^1$ and $R^2$ may or may not be identical.

21. The method of claim 19, wherein the organophilic coating comprises at least one dispersant selected from oleic acid, polybasic fatty acids, alkylbenzene sulfonic acids, alkane sulfonic acids, linear alpha-olefin sulfonic acids, alkaline earth metal salts thereof, polyacrylate esters, and phospholipids.

22. The method of claim 19, wherein the oleaginous wellbore fluid is free of any unassociated surfactants, dispersants, or emulsifiers.

23. The method of claim 19, wherein the wellbore fluid further comprises a silica.

24. The method of claim 19, wherein the wellbore fluid further comprises at least one of a fumed silica and a precipitated silica.

25. The method of claim 19, wherein the wellbore fluid further comprises a surface-modified precipitated silica.

* * * * *